March 26, 1957 T. A. WETZEL 2,786,396
TRACER MECHANISM

Filed Sept. 11, 1953 3 Sheets-Sheet 1

INVENTOR
Theodore A. Wetzel,
BY
Attorney

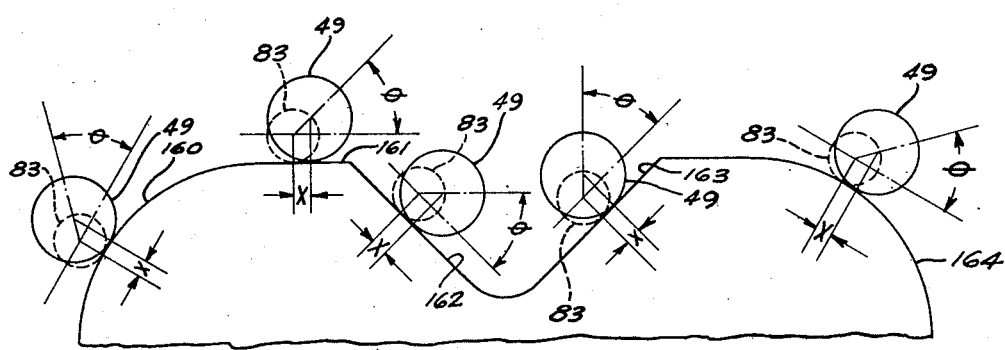

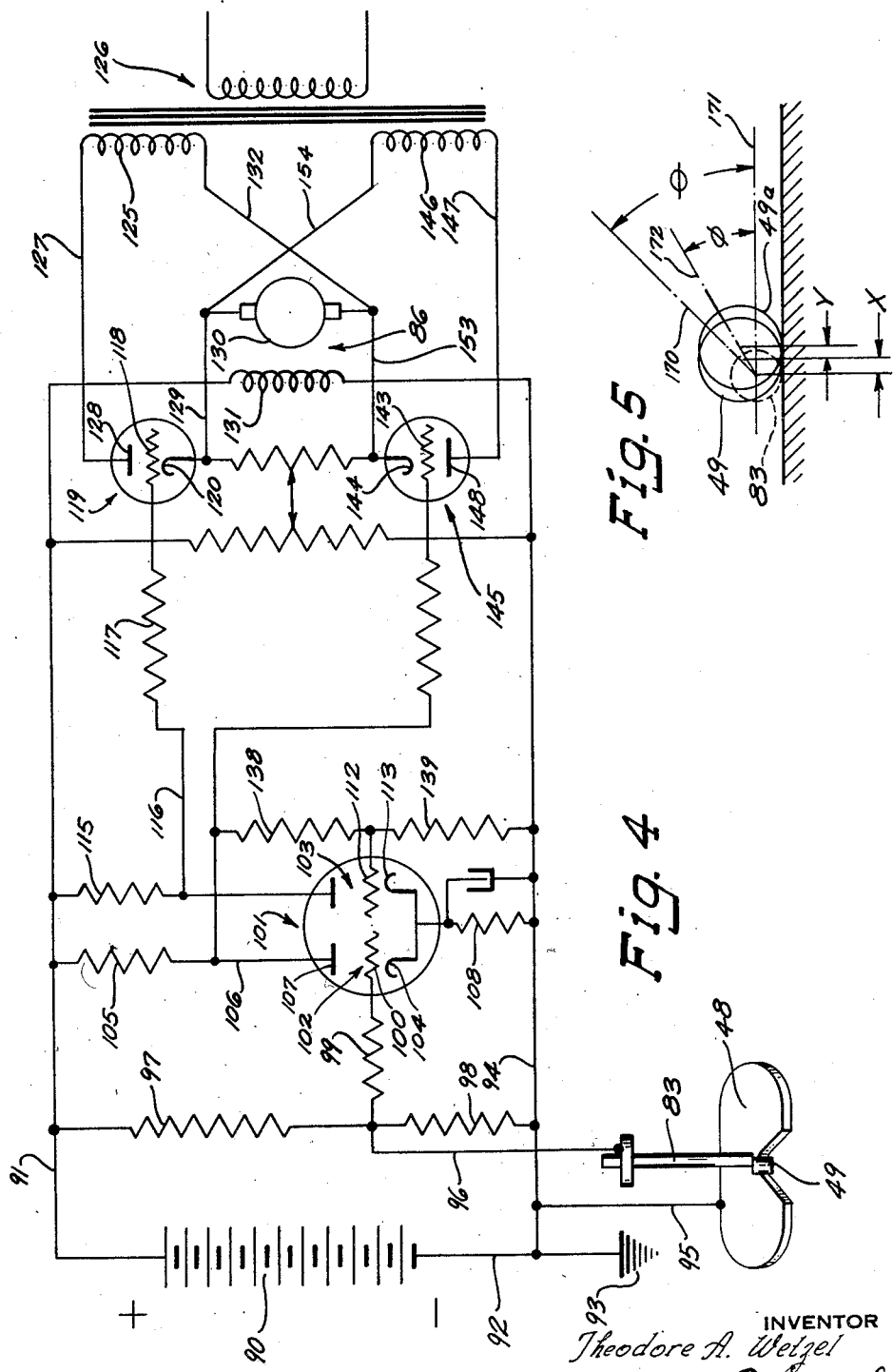

United States Patent Office 2,786,396
Patented Mar. 26, 1957

2,786,396

TRACER MECHANISM

Theodore A. Wetzel, Milwaukee, Wis., assignor to Kearney & Trecker Corporation, West Allis, Wis., a corporation of Wisconsin Application September 11, 1953, Serial No. 379,587

5 Claims. (Cl. 90—13.5)

This invention relates generally, to improvements in tracer controlled machine tools and more particularly to an improved tracer mechanism for producing control in response to the contour of the pattern.

In automatic reproducing machines it is inherent that a certain time lag in motion response exists between the instant when the tracer produces a control signal from the pattern, and when the correction is made to change the path of movement of the cutter correspondingly and nullify the signal. The logical method of compensating for such time lag is by advancing the tracer a small amount ahead of the cutter for anticipating the contour of the pattern, so that the tracer reaches a point on the pattern an instant before the cutter arrives at the corresponding point on the workpiece. With this arrangement, the tracer transmits a signal to the control system upon arriving at a change in the contour of the pattern. During the time that it takes for the control system to react to the signal to guide the cutter accordingly, the cutter is traveling along the the workpiece, and when its direction of movement is changed, it is at the identical point that the traced produced the signal. With this system the accuracy of the reproduction is increased substantially.

The primary problem in achieving such relationship between the tracer and cutter lies in maintaining the advance of the tracer in the direction of movement, especially in those reproducing operations in which the cutter and tracer travel in a 360° path, about the periphery of a workpiece and pattern respectively. The problem may be partially solved by providing a pattern contacting stylus of greater diameter than the cutter. Such a stylus will serve to anticipate a departure in the contour of the pattern when the tangent to the departing surface forms any angle of less than 180° with the tangent to its preceding surface in the direction of stylus travel. When such angle exceeds 180° it provides no anticipation whatsoever. In other words, an oversize stylus will operate to anticipate an inside corner but not an outside corner.

Although the oversize stylus does not anticipate the contour of the pattern throughout its path of travel in 360° contouring, it does serve a useful purpose in anticipating inside corners, because when overtravel of the cutter occurs at inside corners, damage which cannot be remedied will be inflicted upon the workpiece, and possibly upon the cutter. On the other hand, at an outside corner, such overtravel will only cause a small amount of additional material to remain upon the workpiece, and this excess material may be later removed by filing or other material removing process. Nevertheless, it is unsatisfactory for complete accuracy, since for proper reproduction it is necessary to anticipate the contour of the pattern through its entire surface, regardless of whether an inside or outside corner is encountered. This can be achieved by maintaining the tracer stylus a slight amount in advance of the cutter in the path of travel along the outline of the pattern and workpiece respectively.

It is therefore a general object of the present invention to provide an improved tracer mechanism for producing control in response to the contour of the pattern.

Another object of the present invention is to provide an improved tracer mechanism which will operate to anticipate the entire contour of the pattern including outside as well as inside corners.

Another object of the present invention is to provide an improved tracer mechanism wherein the pattern engaging stylus will contact the pattern a predetermined distance in advance of the position of the cutter with respect to the workpiece throughout its path of travel.

Another object is to provide an improved tracer mechanism wherein the advance of the stylus ahead of the cutter will be automatically oriented in conformance with the contour of the pattern to maintain it in the direction of travel.

Another object is to provide an improved tracer mechanism especially adapted for increasing the accuracy of reproducing machines.

A further object is to provide an improved tracer mechanism under the control of an electronic circuit for producing a rapid response to a variation in the contour of the pattern.

A further object is to provide an improved tracer mechanism wherein the tracer stylus and pattern are a part of an electrical circuit, and cooperate in the manner of a switch to close and open the circuit for producing a control signal.

A still further object is to provide an improved tracer mechanism wherein a rotational movement is imparted to the tracer shaft in accordance with the contour of the pattern for controlling the operation of the movable elements of the machine.

A still further object is to provide an improved tracer mechanism wherein the control signal is produced by causing the tracer stylus to move alternately into and out of electrical contact with the pattern.

An additional object is to provide an improved tracer mechanism of simple construction, but efficient and accurate in operation.

According to this invention the improved tracer mechanism includes a pattern contacting stylus eccentrically mounted on the end of a tracer shaft which is journalled in a bracket supported for movement with the cutter. The tracer shaft is connected to be rotated by a motor, for the purpose of pivoting the stylus into and out of engagement with the pattern, which is rendered possible by reason of the eccentricity of the stylus with respect to the tracer shaft. Both the pattern and tracer shaft, including its associated stylus, are electrically conductive and are included in an electronic circuit for controlling the operation of the electric motor driving the tracer shaft. The tracer stylus and pattern function in the manner of a switch, so that when the stylus and pattern are in communication to close the electrical circuit, the electronic circuit is affected to energize the motor for operation in a direction to rotate the tracer shaft for movement of the stylus out of engagement with the pattern. Movement of the stylus out of engagement with the pattern terminates the flow of current therethrough, causing the electronic circuit to reverse the energization of the electric motor and effect its rotation in a direction to cause movement of the stylus into engagement with the pattern. When communication between the stylus and pattern is again obtained, the electronic circuit responds immediately to again reverse the direction of rotation of the motor. The stylus is thus moved into and out of engagement with the pattern, and its movements are minute by reason of the rapid response of the electronic circuit, so that what may be termed a buzzing action is achieved.

Thus, the tracer shaft is oriented to accommodate the pattern for bringing the stylus into and out of engagement with the pattern, and such rotational movement of the stylus in conformance with the contour of the pattern is utilized for controlling the operation of a machine tool transmission, to, in turn, control the rate of travel of the movable elements of the machine. The eccentricity of the stylus with respect to the tracer shaft serves to advance its point of contact with the pattern ahead of the position of the cutter with respect to the workpiece for anticipating the contour of the pattern to compensate for the time lag in direction response as previously described. In addition, since the stylus is consistently being reoriented to accommodate the contour of the pattern, such advance will be retained in the direction of cutter travel.

The foregoing and other objects of this invention, which will become more fully apparent from the following detailed description, may be achieved by means of the exemplifying apparatus depicted in, and set forth in this specification in connection with the accompanying drawing, in which:

Fig. 2 is a diagrammatic view of the transmission and control mechanism embodying the invention as incorporated in the machine shown in Fig. 1;

Fig. 3 is a diagrammatic plan view showing the relation of the tracer stylus with respect to the tracer shaft as the stylus follows the contour of a pattern;

Fig. 4 is a schematic circuit diagram of the electric system for actuating the tracer mechanism comprising the present invention; and, Fig. 5 is a diagrammatic plan view of the tracer stylus and its supporting shaft showing two superimposed positions of the stylus with respect to the shaft.

Figure 1:
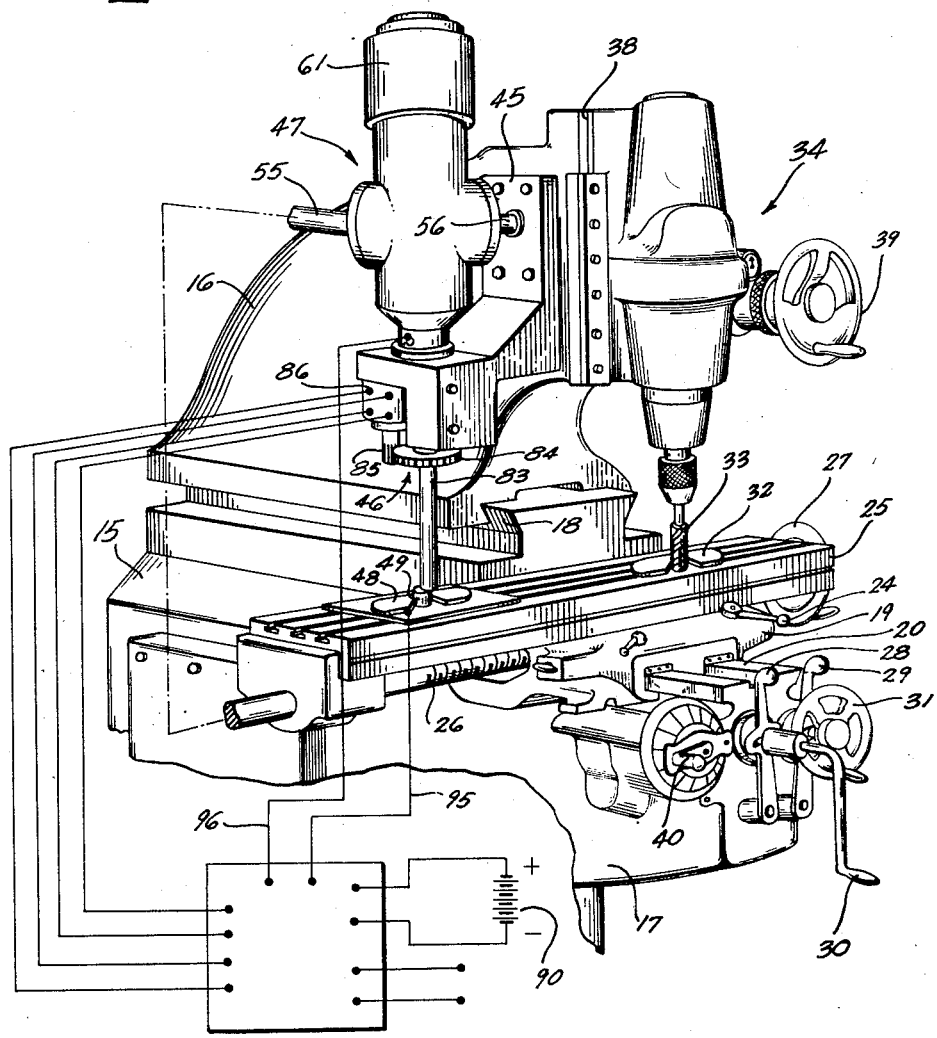
Figure 1 is a fragmentary perspective view partly diagrammatic of a pattern controlled milling machine incorporating the tracer mechanism of the present invention.

Referring more specifically to the drawings, the improved tracer mechanism embodying the teachings of the present invention is shown in conjunction with a milling machine adapted for performing duplicating operations. It will be noted that the machine is of the conventional type comprising a base 15 that serves as a support for a carriage 16 and a knee 17. The carriage 16 is mounted on the top of the base 15 for movement in a horizontal plane, being guided in its path of movement by ways 18. The knee 17 is carried by the base 15 for movement in a vertical path, and is guided along its path of travel by suitable ways (not shown) provided on the front face of the base.

The knee 17 supports a saddle 19 for movement in a horizontal plane in a path substantially parallel to the path of movement of the carriage 16. The top of the knee 17 is shaped to form ways 20 which guide the saddle 19 in its path of travel. The saddle 19, in turn, carries a table 25 for longitudinal movement in a direction transverse to the direction of movement of the carriage 16, suitable ways (not shown) being formed in the top of the saddle 19 for guiding the table 25 in its path of movement.

Movement of the table 25 is effected by rotating a screw 26, either manually by revolving a handwheel 27, or by power in the conventional manner under the control of a lever 24. The knee 17 and saddle 19 may also be actuated in their path of movement by power in either direction; being arranged to be connected for power movement by manipulating a pair of control levers 28 and 29 respectively. Manual movement of the knee 17 is produced by turning a handle 30 while the saddle 19 may be actuated in its path of movement manually by revolving a handwheel 31.

The table 25 carries a workpiece 32 in position for engagement by a cutter 33 which is rotatably supported by a spindle head generally denoted by the numeral 34. The front face of the carriage 16 is provided with ways 38 for slidably supporting the spindle head 34 for vertical movement, and the spindle head may be actuated in its path of movement by rotating a handwheel 39. The spindle head 34 rotatably supports the cutter 33 in position to operate upon the workpiece 32 mounted on the table 25. Power for rotating the cutter 33 is obtained from a motor (not shown), the power being transmitted to the cutter in a well known manner.

A variety of movements have been provided in the machine shown in the drawings, only two of which are utilized for performing the reproducing operation. These two movements are the movement of the carriage 16 and the movement of the table 25, the direction of movement of these two members being in two mutually transverse paths. The other movements have been provided to facilitate setting the machine for the reproducing operation, and to enable it to be utilized as a conventional milling machine, not involving a reproducing operation. To this end, a feed rate selector lever 40 is provided for the purpose of selecting the rate of travel of the several movable elements when they are power driven for normal milling operations other than reproducing.

A bracket 45 is mounted on the side of the carriage 16 extending outwardly therefrom to support the reproducing system comprising a tracer mechanism generally denoted by the numeral 46, and which embodies the teachings of the present invention, and a ball transmission generally indicated by the reference numeral 47. It is to be understood that the tracer mechanism 46 may be utilized with a variety of transmissions arranged to be operated under the control of a tracer mechanism of this type in response to the contour of a pattern. The illustration of the ball transmission 47 of the type described in detail in my copending patent application Serial No. 315,034, filed October 16, 1952, is for exemplary illustration only for the purpose of showing a practical embodiment of the present invention. The utilization of the tracer mechanism 46, however, is not confined to this type of a transmission.

The tracer mechanism 46 cooperates with a pattern 48 mounted on the table 25 in position to be engaged by a stylus 49 of the tracer mechanism 46.

For the purpose of clarifying the operation of the tracer mechanism 46, a general description of the ball transmission 47 will be presented from the diagrammatic view in Fig. 2, where only the principal parts of the transmission are shown, and are illustrated schematically. For a more detailed description of this transmission attention is invited to the previously mentioned copending patent application Serial No. 315,034, filed on October 16, 1952. The ball transmission 47 includes two output shafts 55 and 56, the output shaft 55 being connected to drive the table 25 in its path of movement, and the output 56 being connected to drive the carriage 16 in its path of travel.

In the illustrated embodiment, the use of the ball transmission 47 is confined to reproducing operations, only, and when normal milling operations are to be performed on the machine, the conventional power drive (not shown) is utilized for actuating the table 25. On the other hand, when reproducing operations are to be performed on the machine, the conventional power drives of the machine are rendered inoperative.

The connection of the output shaft 55 to the screw 26 of the table 25 for motivating the table, is indicated diagrammatically in Fig. 1, it being understood that this connection may be effected by any number of well known means, as for example, by a flexible shaft. The output shaft 56, on the other hand, is directed into the interior of the carriage 16, where it is connected to drive a gear train for rotating a nut (not shown) to actuate the carriage 16.

Referring now more particularly to the diagrammatic view in Fig. 2, the ball transmission comprises a ball 60 which is rotated by a motor 61 illustrated in Fig. 1. The motor 61 is connected to rotate a guide wheel 62 which is in frictional driving engagement with the ball 60. In addition to being rotatable about its own axis by the motor 61, the drive wheel 62 is rotatable bodily, to change the position of its axis of rotation, and thereby change the position of the axis of rotation of the ball 60.

The rotation of the ball 60 is utilized for driving the shafts 55 and 56, the rotation of the ball being resolved between these two shafts in a sine-cosine relationship. Power for driving the shafts 55 and 56 is taken from the ball 60 by a pair of power take-off wheels 63 and 64, the take-off wheel 63 being connected to drive the table 25 in its path of movement, and the take-off wheel 64 being connected to drive the carriage 16 in its path of movement as shown diagrammatically in Fig. 2.

The ball 60 is retained in position, and in frictional driving engagement with the drive wheel 62, and the take-off wheels 63 and 64 by three idler wheels. Two of these idler wheels 65 and 66 are in contact with the ball 60 at points diametrically opposite the point of engagement of the power take-off wheels 63 and 64 respectively, to retain the ball in driving engagement with these power take-off wheels. In like manner, an idler wheel 67 is in contact with the ball 60 at a point diametrically opposite the point of contact with the drive wheel 62, to retain the ball in driving engagement with the drive wheel.

The idler 67 is rotatably mounted in a bracket 68 which is supported to rotate with a gear 69. The gear 69 is in the train for transmitting the control signal of the tracer mechanism 46 to the ball transmission 47, the signal serving to rotate the gear 69 and the idler wheel with it.

The gear 69 has meshing engagement with a spur gear 74 keyed to the lower end of a vertical shaft 75 which has keyed to its upper end another gear 76. The gear 76, in turn, has meshing engagement with spur gear 77 fixed to a rotatably mounted bracket 78 supporting the rotating drive wheel 62. With this arrangement, as the gear 69 is rotated in response to the control signal of the tracer mechanism 46, the idler 67 and its cooperating drive wheel 62 rotate in unison with the gear 69 so that these two cooperating wheels are always in alignment.

From the above description of the general construction of the ball transmission 47 it is apparent that when the drive wheel 62 is revolved about its horizontal axis, it will cause the ball 60 to revolve, and the axis of rotation of the ball 60 will be parallel to the axis of rotation of the drive wheel 62, this being true regardless of the position that the axis of the drive wheel 62 is turned to by the gear 69. The power take-off wheels 63 and 64 being in frictional contact with the surface of the ball 60, will be driven with a peripheral speed equal to the surface speed of that part of the ball 60 that they are in contact with. This speed will vary as the cosine of the angle that the axis of rotation of the ball 60 makes with the axis of the driven power take-off wheels 63 and 64.

Because of this sine-cosine relationship between the speeds of the two power take-off wheels 63 and 64, the table 25 and the carriage 16, which receive their power from the two take-off wheels, will also travel at feed rates in a sine-cosine relationship. Such an arrangement is ideal for reproducing machines, for effecting movement in two paths, as it establishes a substantially constant rate of feed of the cutter along the workpiece. Thus, as the axis of rotation of the ball 60 is changed to increase the speed of the carriage 16, the speed of the table 25 is decreased proportionately, and vice versa. At a maximum speed of either one of the two members 16 or 25, the other member will remain stationary.

The tracer mechanism 46 which produces a control signal in response to the contour of the pattern 48 to control the operation of, in this instance, the ball transmission 47, includes a tracer shaft 83 having secured to its lower end the stylus 49 disposed eccentrically with respect to the axis of the tracer shaft 83. The upper portion of the tracer shaft 83 has keyed to it a spur gear 84 having meshing engagement with a pinion 85. The pinion 85, in turn, is keyed to the output shaft of a direct current motor 86. Thus, there is driving engagement between the motor 86 and the tracer shaft 83 so that when the motor 86 is energized it serves to rotate the tracer shaft 83 and its associated stylus 49.

Although the motor 86 is connected to rotate the tracer shaft 83, it does not effect complete rotation, but functions to vibrate the stylus 49 into and out of engagement with the pattern 48. Such vibration occurs by reason of the inclusion of the tracer shaft 83 and the pattern 48 in the motor control circuit, with the latter two elements cooperating to function in the manner of a switch. The electrical circuit for effecting this vibratory movement of the stylus 49 into and out of engagement with the pattern, is illustrated diagrammatically in Fig. 4.

As there shown, voltage is obtained from a direct current source 90 having a line 91 connected to its positive side, and a line 92 connected to its negative side. The line 92, in turn, is connected to a ground 93, and has connected to it a line 94 which carries the negative side of the circuit. The pattern itself is fabricated of an electrically conductive material, and is connected to the negative line 94 by a conductor 95, while the tracer shaft 83 has electrical connection with a conductor 96, the latter being connected between a pair of resistors 97 and 98 which are serially connected across the lines 91 and 94.

There is also connected between the resistors 97 and 98 one end of a resistor 99 having its other end connected to a grid 100 of a double triode vacuum tube generally denoted by the numeral 101, one unit of which is identified in the drawing by the numeral 102, and the other unit being identified by the numeral 103. When the stylus 49 of the tracer shaft 83 is out of engagement with the pattern 48, the voltage on the grid 100 is positive with respect to a cathode 104, so that the current will flow through the unit 102 of the double tube 101. The current flows from the line 91, through a resistor 105 and a conductor 106 to an anode 107, and then to the cathode 104 and a resistor 108 to return to its source through the lines 94 and 92.

While the unit 102 of the tube 101 is conducting current, a grid 112 of the other unit 103 is negative with respect to its associated cathode 113 so that there is no flow of current through the unit 103. Since the unit 103 of the tube 101 is not conducting, the positive voltage connects from the line 91 to a resistor 115, and then through a conductor 116, and another resistor 117 to a grid 118 of an electronic tube generally denoted by the numeral 119. This voltage on the grid 118 of the electronic tube 119 with respect to its cathode 120 causes the tube to become conductive and permit a flow of electrical energy from a secondary coil 125 of a transformer 126, through a conductor 127 to an anode 128 of the tube 119, and thence to the cathode 120. From the cathode 120 the flow of current continues through a conductor 129 to an armature 130 of the direct current motor 86 which has its field 131 connected across the direct current lines 91 and 94. From the armature 130 the current flows into a conductor 132 to return its source represented by the secondary coil 125 of the transformer 126. With the motor 86 thus energized it functions to rotate the tracer shaft 83 to move its associated stylus 49 into contact with the pattern 48.

When this occurs, the resistor 98 is by-passed to connect the resistor 97 directly to the negative line 94 through the conductor 96, to reduce the positive voltage on the grid 100 and render it negative with respect to the cathode 104 and stop the flow of anode current across the unit 102 of the tube 101. When the anode current stops flowing through this unit 102 of the tube 101, the voltage on the grid 112 with respect to its cathode 113 becomes more positive due to an increase in current flow through a pair of serially connected resistors 138 and 139 to the ground 93 by way of the line 94 as occasioned by the increased potential of the anode 107 when unit 102 is nonconducting. Such change in the voltage on the grid 112 renders the unit 103 of the tube 101 conductive. As the unit 103 of the tube 101 begins to conduct electricity, the voltage of the grid 118 diminishes with respect to its cathode 120, and the tube 119 ceases conducting to terminate the armature current, and therefore the torque of the motor 86 in a direction to move the stylus into engagement with the pattern.

However, termination of the flow of current from the anode 107 to the cathode 104 of the unit 102 of the tube 101 causes a decrease in voltage across the load resistor 105 to cause a grid 143 to become more positive with respect to its cathode 144 and permit current flow through a tube 145. When the tube 145 is rendered conductive, it completes an electrical circuit originating at a source represented by a secondary coil 146 of the transformer 126, and continuing through a conductor 147 to an anode 148 of the tube 145. From the anode 148 the current flows to the cathode 144, and thence through a conductor 153 into the armature 130. From the armature 130 the current returns to the source through a conductor 154 to the secondary coil 146.

It will be noted that with the tube 145 conducting, the current through the armature 130 is in a reverse direction from that when the tube 119 is conducting the opposite flow of armature current, causing a torque reversal resulting in stylus motion away from the pattern. As soon as the stylus 49 is moved out of communication with the pattern previously described conditions again exist to cause another reversal of the armature current to reverse the direction of motor rotation and effect a return movement of the stylus 49 into engagement with the pattern. Thus, the stylus is vibrating into and out of engagement electrically with the pattern at a very rapid rate due to the rapid action of the tubes in the control circuit in response to the control signal to produce what may be termed a buzzing action.

In addition to the directional control exercised over the motor 86 by the voltage impressed upon the grids 118 and 143, the motor is further controlled by its own counterelectromotive force, which functions to prevent its overrunning. For example, it will be assumed that the stylus 49 is not in contact with the pattern 48 so that a voltage is impressed upon the grid 118 of the tube 119 to render the tube conductive. With the tube 119 conducting, the armature circuit is closed, as previously described, for rotating the armature 130 in a direction to move the stylus 49 into engagement with the pattern.

The flow of current through the tube 119 depends upon the voltage of the grid 118 being greater than the voltage upon the cathode 120. As the flow of current through the tube 119 continues, the speed of the motor 86 increases. However, as the speed of the motor increases, its counterelectromotive force increases proportionately, to increase the voltage upon the cathode 120 so that it approaches the voltage of the grid 118, and thereby reduces the difference in potential between the grid 118 and the cathode 120 to limit the flow of current through the tube.

If the motor 86 was connected for unidirectional operation, its counterelectromotive force would serve to govern the speed of the motor, preventing it from attaining excessive speeds. Since the direction of rotation of the motor 86 is alternating rapidly in the present arrangement, the effect of its counterelectromotive force is to prevent the motor from overrunning its movement in either direction. Since the difference of potential between the grid 118 and the cathode 120 is limited by the counterelectromotive force of the motor 86, it requires only a slight increase in the voltage on the grid 118 to stop the flow of current through the tube 119 and terminate the torque of the motor 86. This results in a faster response of the motor to the signal of the stylus 49, and a greater frequency of vibration of the stylus.

Upon a reversal of the direction of rotation of the motor, its counterelectromotive force is impressed upon the cathode 144 of the tube 145. This results in the same effect on the conductivity of the tube as described above for the tube 119. Thus, the same effect is achieved in either direction of rotation of the motor 86.

As the motor 86 is being actuated in its two directions of movement, it serves to similarly actuate the tracer shaft 83 by reason of the connection previously described. Such movement of the tracer shaft 83, in turn, causes a corresponding vibratory movement of the stylus 49 which is secured to the lower end of the tracer shaft 83, and eccentrically disposed therewith in position to engage the contour of the pattern 48. The eccentricity of the stylus 49 with respect to its cooperating shaft 83 is clearly illustrated diagrammatically in Fig. 3, where the tracer shaft 83 is depicted by a circle in broken lines, and the stylus 49 is shown as a solid circle, the two elements being superimposed to illustrate their relationship as the stylus progresses along the contour of the pattern.

A line drawn through the axis of the tracer shaft 83, and the axis of the stylus 49, forms an angle θ with a line representing the path of movement of the tracer shaft 83, which would be parallel to a line tangent to the contour of the pattern. It has been found that for optimum results, the eccentricity of the stylus 49 with respect to the tracer shaft 83 should be such that the value of the angle θ will be approximately 45 degrees. Such eccentricity of the stylus 49 permits it to be moved into and out of engagement with the pattern by the rotary movement of the tracer shaft 83.

It is to be understood that the movement of the stylus 49 away from the pattern is of a very minute degree, since immediately upon being moved out of communication with the pattern, the control circuit previously described, responds to reverse the direction of movement and re-engage the stylus 49 with the pattern. Similarly, when the stylus 49 makes electrical contact with the pattern, the electrical control circuit again responds to reverse the direction of movement and move the stylus out of engagement with the pattern. Thus, a very rapid vibratory movement occurs when the stylus 49 moves along the contour of the pattern, and as it does so it vibrates into and out of engagement with the surface of the pattern. Therefore, as the contour of the pattern changes, the tracer shaft 83 will orient itself accordingly to always place the stylus 49 into engagement with the pattern, after a short pivoting movement of the stylus 49 away from the pattern.

As the tracer shaft pivots in this manner, in accordance with the contour of the pattern, to intermittently bring the stylus 49 into electrical contact with the pattern, it moves in a rotary motion to accommodate the contour of the pattern. This rotary motion of the tracer shaft 83 serves as a control signal for regulating the movement of the carriage 16 and the table 25 in their respective paths of travel, for the purpose of causing the stylus 49 to follow the contour of the pattern, as well as effecting relative movement between the cutter 33 and the workpiece 32 to reproduce the pattern in the workpiece.

In this particular instance, since the tracer mechanism 46 is illustrated in connection with the ball transmission 47, the rotary movement of the tracer shaft 83 is utilized for steering the drive wheel 62, to thereby control the transmission of power to the output shafts 55 and 56 for regulating the rate of travel of the table 25 and the carriage 16 as previously described. The transmission of the rotary movement of the tracer shaft 83 in response to the contour of the pattern to the drive wheel 62 is accomplished by connecting the tracer shaft 83 to an elongated hub 155 of the gear 69, and fixing the tracer shaft 83 to the hub 155 by a set screw 156. With this connection, rotation of the tracer shaft 83 causes a corresponding rotation of the gear 69, and this movement is transmitted to the drive wheel 62 by reason of the gear train previously described.

In addition to enabling a movement into and out of engagement with the pattern by a rotary movement of the tracer shaft 83, the eccentricity of the stylus 49 with respect to its supporting shaft 83 serves an additional purpose of anticipating the change in contour of the pattern to increase the accuracy of the reproduction. This is accomplished by causing the stylus 49 to contact the pattern a slight amount ahead of the point that the cutter is engaging the workpiece, so that the tracer stylus contacts a point on the pattern an instant before the cutter arrives at the corresponding point on the workpiece. In addition, the rotary motion of the tracer shaft 83 to accommodate the contour of the pattern, as it alternately moves the stylus 49 into and out of engagement with the pattern serves to maintain the advance of the stylus ahead of the cutter in the direction of stylus and cutter movement as they travel along the contour of the pattern.

With this arrangement, the tracer produces a control signal upon arriving at a change in contour on the pattern. Since the cutter is lagging the tracer stylus, it is traveling along the workpiece while the control system is reacting to the signal to guide the cutter accordingly. Therefore, when the cutter arrives at the point that the tracer produced the signal, the control system has reacted to the signal to effect a change in its direction of movement in accordance with the contour of the pattern. In this manner, the improved tracer mechanism comprising the present invention compensates for the time lag in motion response existing from the time that the tracer produces a control signal from the pattern to the time that the correction is made to change the path of movement of the cutter correspondingly and terminate the signal. Thus, the accuracy of the reproduction is substantially increased.

The operation of the present tracer mechanism to provide for such advance of the tracer stylus, and to maintain the advance in the direction of cutter and stylus movement is apparent from the diagrammatic view shown in Fig. 3, where the stylus 49 is depicted as it progresses to the right along the contour of a pattern. For the purpose of this description, it will be assumed that the cutter 33 is disposed in the same position with respect to the workpiece 32 that the tracer shaft 83 assumes with respect to the pattern 48. Thus, in Fig. 3, the illustration of the tracer shaft 83 as a dotted circle, also indicates the position of the cutter 33 with respect to the workpiece 32. With this in mind, the diagrammatic view of Fig. 3 serves the purpose of illustrating the relative position of the stylus 49 with respect to the tracer shaft 83 as well as the relative position of the stylus 49 and the pattern 48 in comparison with the position of the cutter 33 relative to the workpiece 32.

In the first position of the stylus 49 and cutter 33 as illustrated on the left side of Fig. 3, the stylus is shown negotiating a curved portion 160 of the pattern as it progresses to the right. The stylus 49 is contacting the pattern a slight amount in advance of the point of contact of the cutter 33 with the workpiece, and the amount of advance is represented by the distance X in Fig. 3. The value of the distance X is shown greatly exaggerated in the drawing for the purpose of clarifying the illustration, since in actual practice its value will be only a few thousandths of an inch. It will also be noted that the direction of the advance from the point of contact of the cutter to the point of contact of the stylus is in the direction of movement, parallel to the tangent of the pattern at the point of contact.

As the stylus proceeds to the right along the pattern in a clockwise direction, it reaches a horizontal portion 161. As the tracer shaft 83 brought the stylus 49 into electrical contact with the pattern it was necessary for it to rotate several degrees in a clockwise direction to accommodate the pattern. As it did so, it also reoriented the advance X so that the distance from the point of contact of the cutter to the point of contact of the stylus is in the direction of movement, or parallel to the straight line portion 161 of the pattern, while the value of the advance X remains the same.

In the third position depicted in Fig. 3 the stylus 49 is proceeding along another straight line portion 162 of the pattern, disposed 45° from the horizontal portion 161. In order to bring the stylus 49 into electrical contact with the pattern, it was necessary for the tracer shaft 83 to pivot further in a clockwise direction when the straight line portion 162 was encountered. It therefore again reoriented the advance X to position it in the direction of relative movement, parallel to the straight line portion 162 of the pattern, in a south-easterly direction.

As the stylus 49 progresses along the pattern, it reaches another straight line portion 163 of the pattern located 90° from the preceding straight line portion 162. When this portion of the pattern was encountered it was necessary for the tracer shaft 83 to effect a greater pivoting movement in a counterclockwise direction to move the stylus 49 out of electrical contact with the pattern as it progressed along its contour. In doing so it also reoriented the position of the advance X to place it in the direction of movement, parallel to the straight line portion 163 of the pattern, in a north-easterly direction in contrast to the south-easterly direction of its location while the straight line portion 162 was being negotiated.

In the final illustrated position of the stylus 49, in Fig. 3, it is shown negotiating a curved portion 164 of the pattern, similar to the curved portion 160. The distance of advance X is again tangent to the point of contact with the pattern, but in this instance, since the stylus is traveling in a clockwise direction about the pattern, the advance X representing the distance from the point of contact of the cutter to the point of contact of the stylus, is in a south-easterly direction, rather than a north-easterly direction as was true when the stylus 49 was negotiating the curved portion 160, as depicted in the first illustrated position of the stylus 40 in Fig. 3.

It is apparent therefore from the diagrammatic view in Fig. 3, that the advance X, representing the relative distance from the point of contact of the cutter with the workpiece to the point of the contact of the stylus with the pattern remains constant. In addition, the direction of this advance is constantly reoriented by the action of the tracer shaft 83 as the stylus progresses along the pattern, to position it along the direction of movement. Thus, the desired anticipation for accurate reproduction is obtained throughout the entire path of travel along the contour of the pattern.

Another outstanding advantage of the eccentrically disposed stylus lies in the ready adjustability of the amount of advance X to suit the conditions. The value of the dimension X may be easily varied merely by changing the value of the angle formed by the line drawn through the axis of the tracer shaft 83 and the axis of the stylus 49 and the line representing the direction of linear movement of the tracer shaft 83. This feature of the present invention is clearly illustrated in the diagrammatic view of Fig. 5 where two different positions of the stylus 49 are superimposed to show the change in the distance of advance upon a change in value of the above mentioned angle.

The distance of advance varies inversely as the value of the angle. Thus, when the angle is increased the distance of advance decreases, and when the angle is decreased the distance of advance increases. For example, in Fig. 5, the first position of the stylus is identified by the numeral 49, while its second position superimposed on the drawing is identified by the numeral 49a. In the first position, a line 170 is drawn through the axis of the tracer shaft 83 and the axis of the stylus 49, and the direction of linear movement of the tracer shaft 83 is represented by a line 171. The angle $\theta$ is formed by the lines 170 and 171, and its value is 45°. With the stylus 49 in this position with respect to the tracer shaft 83, it provides an advance X which indicates the relative distance from the point of contact of the cutter 33 with the workpiece to the point of contact of the stylus 49 with the pattern.

In the second superimposed position of the stylus, a line 172 is drawn through the axis of the tracer shaft 83 and the axis of the stylus 49a, and this line forms a substantially reduced angle $\phi$ with the line 171 drawn along the direction of movement. The angle $\phi$ is shown as having a value of 30°, a reduction of 15° from the value of the angle $\theta$. With this reduction in the value of the angle $\theta$, the amount of advance of the stylus ahead of the cutter has been increased by the distance Y as shown in the drawing. Therefore, the relative distance from the point of contact of the cutter 33 with the workpiece to the point of contact of the stylus 49 with the pattern is the sum of the dimensions X and Y rather than merely the distance X as existed with the greater angle $\theta$.

Thus, a convenient means has been provided for varying the amount of anticipation to suit the particular situation. In the illustrated example, a substantial change of 15° has been depicted in the value of the angle for the purpose of clarity, to show a substantial value for the dimension Y. In actual practice these values would be diminished considerably since the amount of actual anticipation is much less than that shown in the drawings.

In the illustrated embodiment the electrical circuit has been shown adapted to cause the stylus 49 to move into and out of engagement with the contour of the pattern 48 since that is the most practical mode of operation for general purposes. In some instances, satisfactory operation may be obtained by yieldably urging the stylus into continuous contact with the contour of the pattern.

This may be accomplished with the circuit illustrated in Fig. 4 merely by breaking the circuit from the tracer shaft 83 to the juncture of the resistors 97, 98 and 99, as for example, by disconnecting the conductor 96 at either terminal. With the conductor 96 thus disconnected, contact of the stylus 49 with the pattern will not have the affect of reversing the motor 86 to move the stylus 49 away from the pattern, but rather, the motor 86 will constantly but yieldably urge the stylus 49 into engagement with the pattern. Then, as relative movement is effected to cause the stylus 49 to travel along the contour of the pattern, the pattern acts as a cam which will cause the stylus to move one way or the other, depending upon the configuration of the pattern, to cause a corresponding rotation of the tracer shaft 83 for producing the control signal.

When a protrusion is arrived at in the pattern, it will force the stylus away from the pattern against the pressure exerted upon it by the motor 86. On the other hand, when the pattern recedes, the action of the motor functions to move the stylus in the opposite direction to maintain contact with the pattern. Such an arrangement operates satisfactorily when the contour of the pattern varies gradually and does not include any abrupt changes. The eccentricity of the stylus with respect to the tracer shaft 83 is not sufficient to enable such camming action to function properly at abrupt changes in the pattern contour, and for that reason it is usually necessary to provide for the intermittent engagement of the stylus 49 with the pattern 48.

The degree of eccentricity of the stylus 49 with respect to its supporting shaft 83, and the amount of advance of the point of contact of the stylus with the pattern, ahead of the corresponding point of contact of the cutter with the workpiece is shown in Fig. 3 greatly exaggerated for the purpose of clarity. In actual practice these values are not large and it can therefore be readily realized that such a degree of eccentricity is not adaptable for the camming action at abrupt changes in the pattern contour. The intermittent engagement of the stylus with the pattern provides a convenient means for overcoming this objection and it is found to be necessary in most applications.

From the foregoing detailed description of the illustrative embodiment set forth herein to exemplify the present invention, it will be apparent that there has been provided an improved tracer mechanism wherein the tracer stylus is especially adapted to contact the pattern a predetermined distance in advance of the point of contact of the cutter and the workpiece, with such advance being constantly maintained in the direction of movement throughout the entire contour of the pattern, and in which the distance of such advance may be readily adjusted to meet the particular conditions.

Although the exemplary embodiment of the invention has been described in considerable detail in order to fully disclose a practical working apparatus incorporating the invention, it is to be understood that the particular structure shown and described is illustrative only, and that the various characteristics of the invention may be incorporated in other structural forms without departing from the spirit and scope of the invention as defined in the subjoined claims.

The principles of the invention having now been fully explained in the foregoing description of embodying apparatus, I hereby claim as my invention:

1. In a control system, a tracer assembly for following the contour of a pattern to produce control comprising, a stylus mounted to engage the surface of said pattern, a motor connected to move said stylus toward or away from said pattern, a source of electric current connected to supply current to said pattern, electronic tubes connected to control the direction of rotation of said motor, and an electrical connection between said stylus and said electronic tubes, the arrangement being such that when said stylus engages the pattern a circuit is completed from said source to said tubes to influence the action of said tubes so that said motor will be energized in a direction to move the stylus away from the pattern, and when said stylus moves out of engagement with the pattern to break the circuit from said source to said tubes, the latter will be influenced to cause energization of said motor to move the stylus toward the pattern, whereby the stylus will be caused to vibrate into and out of engagement with the surface of the pattern as it is moved along its contour.

2. In a control system, a tracer assembly for following the contour of a pattern to produce control comprising, a stylus movably mounted to be engageable with the surface of said pattern, a motor connected to move said stylus toward or away from said pattern, a source of electric current connected to supply current to said pattern, an electric circuit connected to control the direction of rotation of said motor, and an electrical connection between said stylus and said electric control circuit so that a flow of current from said stylus will influence the control circuit, the arrangement being such that when said stylus engages the pattern a circuit is completed from said source to said electric control circuit to influence the circuit to cause energization of said motor in a direction to move the stylus away from the pattern, and when said stylus moves out of engagement with the pattern to break the circuit from said source to said electric control circuit, the latter will be influenced to cause energization of said motor to move the stylus toward the pattern, whereby the stylus will be caused to vibrate into and out of engagement with the surface of the pattern as it is moved along its contour.

3. In a reproducing machine for reproducing the contour of a pattern in a workpiece, a frame, a cutter, a cutter support and a work support mounted on said frame for relative movement in two mutually transverse directions, a tracer shaft rotatably mounted on said cutter support and connected to control the relative movement between said supports by its rotational movement to cause said tracer shaft to move along the contour of the pattern, said tracer shaft having the location of its axis fixed relative to the axis of said cutter during the reproducing operation with its axis disposed in a position relative to the contour of the pattern corresponding to the position of the axis of said cutter relative to the workpiece along its contour so that said tracer shaft being of the same diameter as said cutter and extending into the plane of the pattern it would be caused to contact the pattern at the same relative position that said cutter contacts the workpiece, a stylus fixed to said tracer shaft in position to physically contact the contour of the pattern, said stylus being eccentrically mounted on said tracer shaft so that it contacts the contour of the pattern a distance in advance of the corresponding point of contact of said cutter with the workpiece throughout the path of travel along the periphery of the pattern and workpiece respectively, and power means connected to rotate said tracer shaft about its axis in response to the contour of the pattern to pivot said stylus about the axis of said tracer shaft for movement relative to the axis of said tracer shaft to adjust the direction of said advance for maintaining it substantially in the direction of cutter travel.

4. In a reproducing machine for reproducing the contour of a pattern in a workpiece, a cutter, a pattern, a tracer shaft mounted for rotational movement about its axis and having the location of its axis fixed relative to the axis of said cutter during the reproducing operation with its axis disposed in position relative to the contour of the pattern corresponding to the position of the axis of the cutter relative to the workpiece along its contour so that said tracer shaft being of the same diameter as the cutter and extending into the plane of the pattern it would be caused to contact the pattern at the same relative position that said cutter contacts the workpiece, a stylus eccentrically mounted on said tracer shaft in position to physically engage said pattern selectively by effecting a rotational movement of said tracer shaft, actuating means connected to actuate said tracer shaft in its rotational movement about its axis in either direction to pivot said stylus about the axis of said tracer shaft for movement relative to the axis of said cutter into or out of engagement with said pattern, and a control circuit connected to control said actuating means in its direction of movement and responsive to the engagement of said stylus with said pattern to cause said actuating means to rotate said tracer shaft in a direction to move said stylus out of engagement with said pattern, and responsive to the disengagement of said stylus with said pattern to cause said actuating means to rotate said tracer shaft in a direction to move said stylus into engagement with said pattern, whereby said stylus will be caused to vibrate into and out of engagement with the surface of said pattern as it is moved along its contour to effect a rotational movement of said tracer shaft in accordance with the contour of said pattern for producing control of the translational movement of said cutter relative to the workpiece.

5. In a reproducing machine for reproducing the contour of a pattern in a workpiece, a cutter, a pattern, a tracer shaft supported for rotational movement about its axis and having the location of its axis fixed relative to the axis of said cutter with its axis disposed in position relative to the contour of said pattern corresponding to the position of the axis of said cutter relative to the workpiece along its contour so that said tracer shaft being of the same diameter as the cutter and extending into the plane of the pattern it would be caused to contact the pattern at the same relative position that the cutter contacts the workpiece, a stylus eccentrically mounted on said tracer shaft in position to be actuated relative to the axis of said cutter by the rotation of said tracer shaft for movement into physical engagement with said pattern by one direction of rotation of said tracer shaft and for movement away from said pattern by the opposite direction of rotation of said tracer shaft, and actuating means connected to effect rotational movement of said tracer shaft in either direction to alternately move said stylus into and out of engagement with said pattern, whereby the rotational movement of said tracer shaft to accommodate the contour of said pattern for moving the stylus into contact therewith is utilized to control the translational movement of said cutter relative to the workpiece.

References Cited in the file of this patent

UNITED STATES PATENTS

| | | |
|---|---|---|
| 2,331,337 | Meyer | Oct. 12, 1943 |
| 2,351,626 | Muller | June 20, 1944 |
| 2,507,982 | Krause | May 16, 1950 |
| 2,704,012 | Trinkle | Mar. 15, 1955 |
| 2,704,956 | Johnson | Mar. 29, 1955 |

FOREIGN PATENTS

| | | |
|---|---|---|
| 709,517 | Germany | Aug. 19, 1941 |